United States Patent [19]

Crosby

[11] Patent Number: 5,097,428
[45] Date of Patent: Mar. 17, 1992

[54] DATA OCCURRENCE FREQUENCY ANALYZER

[75] Inventor: Philip S. Crosby, Portland, Oreg.
[73] Assignee: Tektronix, Inc., Beaverton, Oreg.
[21] Appl. No.: 290,553
[22] Filed: Dec. 27, 1988
[51] Int. Cl.[5] ........................ G06F 15/36; G06M 1/10
[52] U.S. Cl. .................................... 364/554; 364/717; 377/72
[58] Field of Search ............... 364/554, 717, 717.5; 377/72, 73, 77; 382/51

[56] References Cited

U.S. PATENT DOCUMENTS

| | | | |
|---|---|---|---|
| 3,978,413 | 8/1976 | Frohwerk | 377/72 |
| 4,429,300 | 1/1984 | Yamasawa et al. | 377/73 |
| 4,475,237 | 10/1984 | Glasby | 382/10 |
| 4,692,897 | 9/1987 | Crabbe | 364/900 |
| 4,774,681 | 9/1988 | Frisch | 364/554 |
| 4,860,236 | 8/1989 | McLeod et al. | 364/717 |

OTHER PUBLICATIONS

Kerman, A Facility for Analyzing Microprocessor System Performance, 1979, pp. 79-82, IEEE Compler.

Primary Examiner—Felix D. Gruber
Attorney, Agent, or Firm—Boulden G. Griffith; Francis I. Gray

[57] ABSTRACT

An apparatus for counting the number of times that each of a large number of digital data patterns are present on a set of signal lines comprises a plurality of random access memories (RAMs) and a feedback means, arranged to form an array of linear feedback shift registers. The data to be analyzed is applied to the address inputs of the RAMs where it selects one of the linear feedback shift registers in the array. A data-valid signal associated with this data causes the selected linear feedback shift register to increment (or decrement) in its pseudo-random count. After the analysis period is over, the value at each address is read out and translated using a lookup table or other translating means from the pseudo-random code of the linear feedback shift register into a meaningful number. This result may then be displayed; for example, in a histogram. An improved feedback path for the linear feedback shift register avoids hang-up states and the need for initialization. A mux can be used to switch between two alternative feedback paths, allowing the apparatus to operate in a count-up mode or a count-down mode.

14 Claims, 4 Drawing Sheets

DATA OCCURRENCE FREQUENCY ANALYZER

BACKGROUND OF THE INVENTION

The present invention relates to the fields of computer performance analysis and data converter testing, and more particularly to the field of methods and apparatuses for counting the occurrence of different data patterns as they appear on a communication bus within a computer system or on the output of an analog to digital converter.

In analyzing the performance of a computer system as it executes a program, or in analyzing the performance of an analog to digital converter, it is frequently desirable to be able to count the occurrence of each of a variety of different digital patterns as they appear on a bus or the output of the converter. In many cases, the desired count should reflect the duration of the patterns of data, as well as its initial occurrence. When a variety of such data patterns are occurring rapidly, and there is a need to identify them and count the occurrences of each particular pattern, an apparatus is needed which can sort and count such patterns as rapidly as possible with a minimum of hardware.

Prior art solutions to this problem have included a variety of methods. A straightforward approach, but one which is hardware intensive, is to dedicate a word recognizer and a counter to the tasks of recognizing each pattern and counting the data valid signals that occur while that pattern is present. For a large number of such patterns, this approach is prohibitively expensive, since significantly more circuitry is required for each additional pattern of interest.

An improvement on this scheme is to use only one counter to do all of the counting, but keep track of separate sums for each different pattern of interest. Such a technique is described in a paper by Steven Kerman, entitled: *A Facility for Analyzing Microprocessor System Performance*, published in the Digest of Papers, IEEE Compcon, 1979. In this system, a large number of counters are simulated by one counter and a random access memory. During the occurrence of each event the counter counts clock pulses and its concluding count is added to a stored value in memory. The same adder is successively employed to update many different memory locations. While this approach is more effective than a multiplicity of counters, it is still somewhat hardware intensive and slower than desired because of the time required for operation of the adder. A lack of speed can significantly limit the usefulness of a data occurrence frequency analyzer in real-time applications.

A further improvement to this technology is disclosed in U.S. Pat. No. 4,774,681 to Arnold Frish for a "Method and Apparatus for Providing a Histogram", Sept. 27, 1988. Frish improved on the method of Kerman by eliminating the adder and substituting a linear feedback shift register for the conventional counter. By eliminating the adder, significant time savings are made possible, increasing the maximum speed of operation attainable. Similarly, the substitution of the linear feedback shift register for the conventional counter also produces some time savings.

Nonetheless, there is still room for improvement over the method disclosed by Frish. In Frish's approach, it takes time to load and unload the shift register, creating a limitation on the maximum speed that is attainable with any particular implementation technology. What is desired is an even faster and more efficient method of counting the number of times that each of a large number of different digital patterns are present.

SUMMARY OF THE INVENTION

The present invention is an improved apparatus for keeping track of the number of times that each of a large number of digital patterns appear on a set of signal lines. It consists of a plurality of random access memories (RAMs) and a feedback path arranged to form an array of linear feedback shift registers. The data to be analyzed is applied to the address input of the RAMs where it selects one of the linear feedback shift registers in the array. A data-valid signal associated with this data causes the selected linear feedback shift register to increment (or decrement) in its pseudo-random count. After the analysis period is over, the value at each address is read out and translated from the pseudo-random code of the linear feedback shift register into a meaningful number. This result may then be displayed; for example, in a histogram.

DETAILED DESCRIPTION

Figure 1:
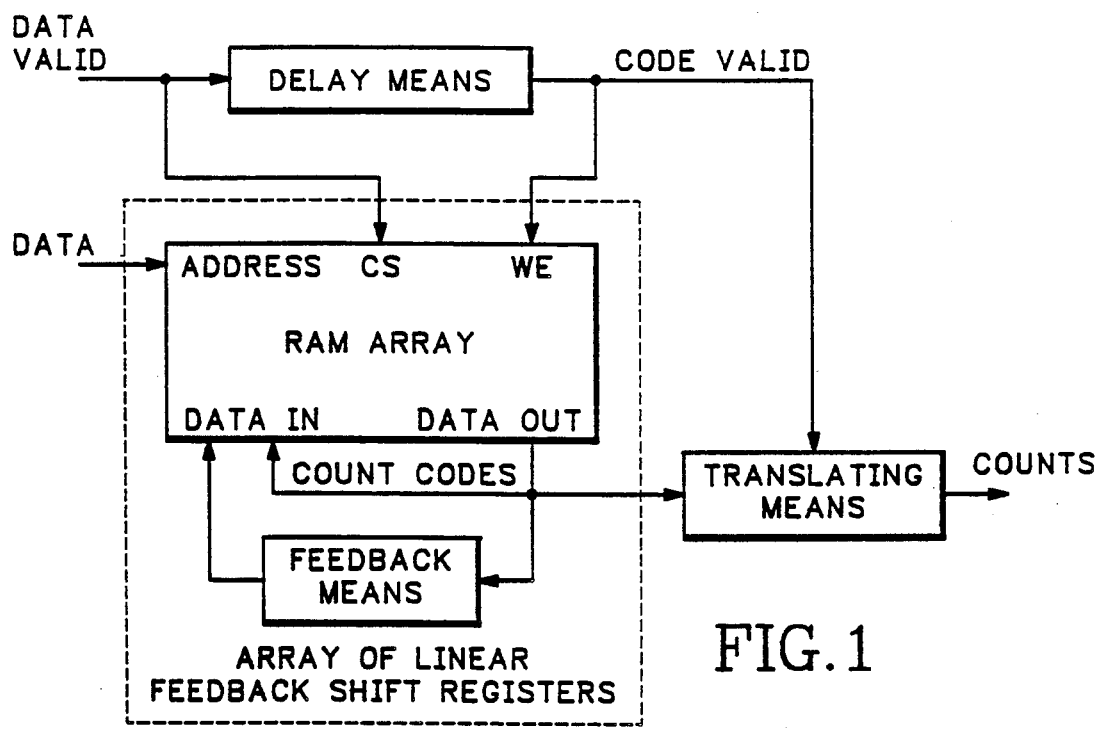
FIG. 1 is a block diagram of the invention.

Referring to FIG. 1, an array of random access memories (RAM Array) and a feedback means are arranged to form an array of linear feedback shift registers. The data to be analyzed is applied to the address inputs of the RAM Array where it selects one of the linear feedback shift registers. A Data Valid signal and a delayed version of it, Code Valid, cause the selected linear feedback shift register to increment (or decrement) in its pseudo-random count. After the analysis period is over, the Translating Means is used to convert the pseudo-random codes in each of the linear feedback shift registers into meaningful counts. Each count code stored in the RAM Array is addressed by the data value counted to produce it.

Figure 2:
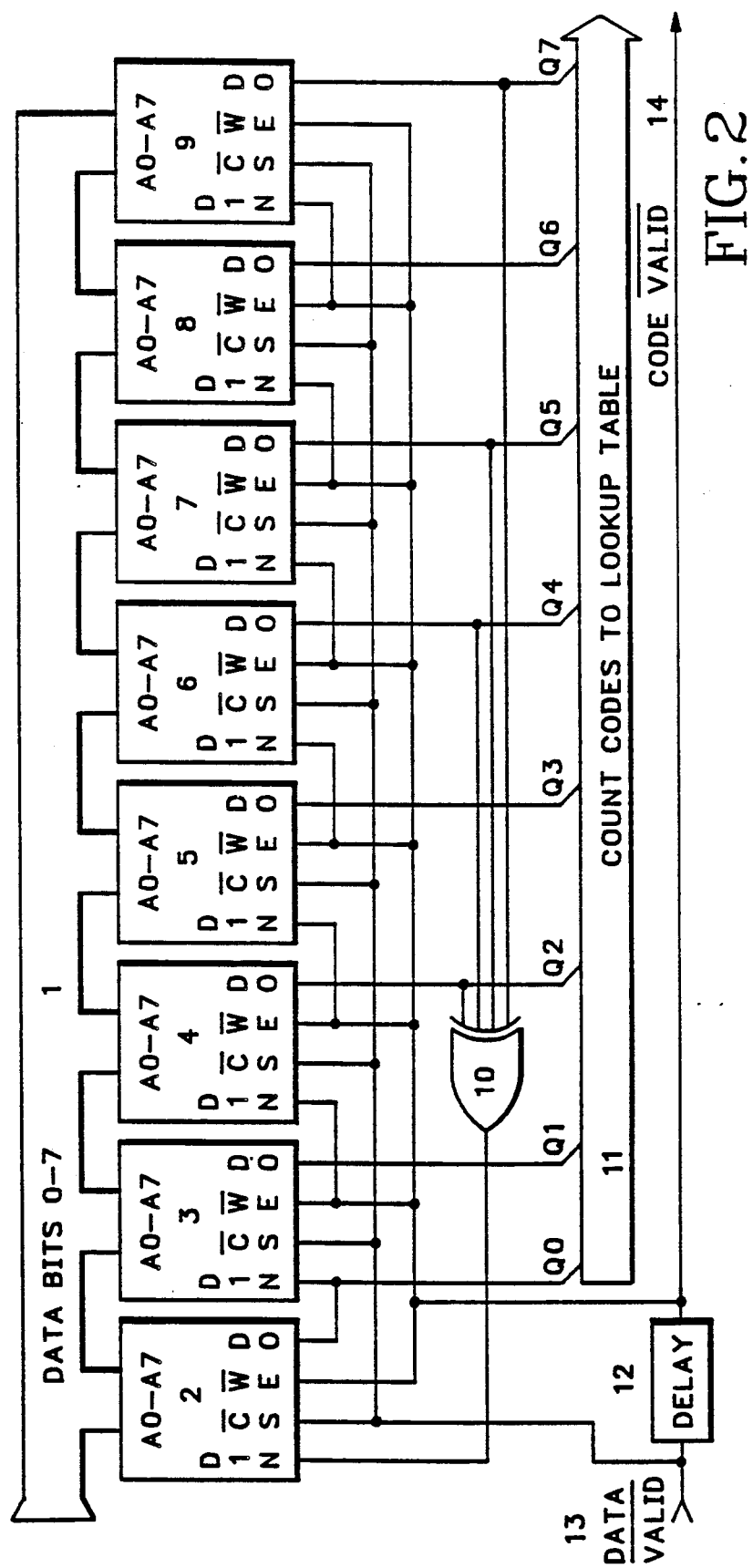
FIG. 2 is a schematic diagram of the RAM array and feedback path arranged to form an array of linear feedback shift registers according to the present invention.

Referring to FIG. 2, Data Bits 0-7 arriving over a set of eight signal lines 1 are connected to the address inputs of eight 1-bit random access memories (RAMs) 2-9. With the exception of the first RAM 2, the data input D-in of each RAM 3-9 is connected to the data output D-o of the preceding RAM. The data input D-in of the first RAM 2 receives its input from the output of the exclusive-OR (XOR) gate 10. The data output D-o of several, but not all, of the RAMs 2-9 are also connected to the inputs of the XOR gate 10 to provide the feedback for the array of linear shift registers.

The chip select /CS of each of the RAMs 2-9 is connected to the Data-not-Valid signal 13. The Data-not-Valid 13 signal is also applied to delay means 12, to produce Code-not-Valid 14. The signal Code-not-Valid 14 is connected to the write enable WE input of each of the RAMs 2-9.

In operation, when Data-not-Valid goes low, representing a "data is now valid" condition, the Data Bits 0-7 are latched into the RAMs 2-9 and the data at the location in each RAM identified by that address appears on the data outputs D-o of the RAMs. When Code-not-Valid then goes low too, after the time of the delay means, the output data from each RAM is stored in the same address location in the next RAM, except in the case of the first RAM 2 which gets its input data from the feedback path through XOR gate 10. The duration of the Data-not-Valid low signal must be longer than the time of the Delay 12.

For each data-valid/code-valid sequence, as described above, the RAM-based linear feedback shift register at that particular address is incremented in its pseudo-random count. When the Data Bits 0-7 change between data-valid/code-valid sequences, the results of that counting process are already stored in the RAMs 2-9 at that address, and the pseudo-random count at another address is incremented instead.

After the data on the signal lines has been analyzed over a suitable period of time, the values stored at each address in the RAMs 2-9, the count codes 11, are sent to a lookup table (not shown here, but represented by the Translating Means in FIG. 1) for translation into meaningful numbers for display. These counts can then be used as the basis for a display, such as a histogram. The period of analysis cannot be longer, in terms of the number of occurrences of the data valid signal, than the maximum count of the linear feedback shift registers. The maximum count of the linear feedback shift register employing eight RAMs shown in FIG. 2 is 255 (2·N - 1, where N is the number of RAMs), but the same principles would work with much longer ones.

Figure 3:
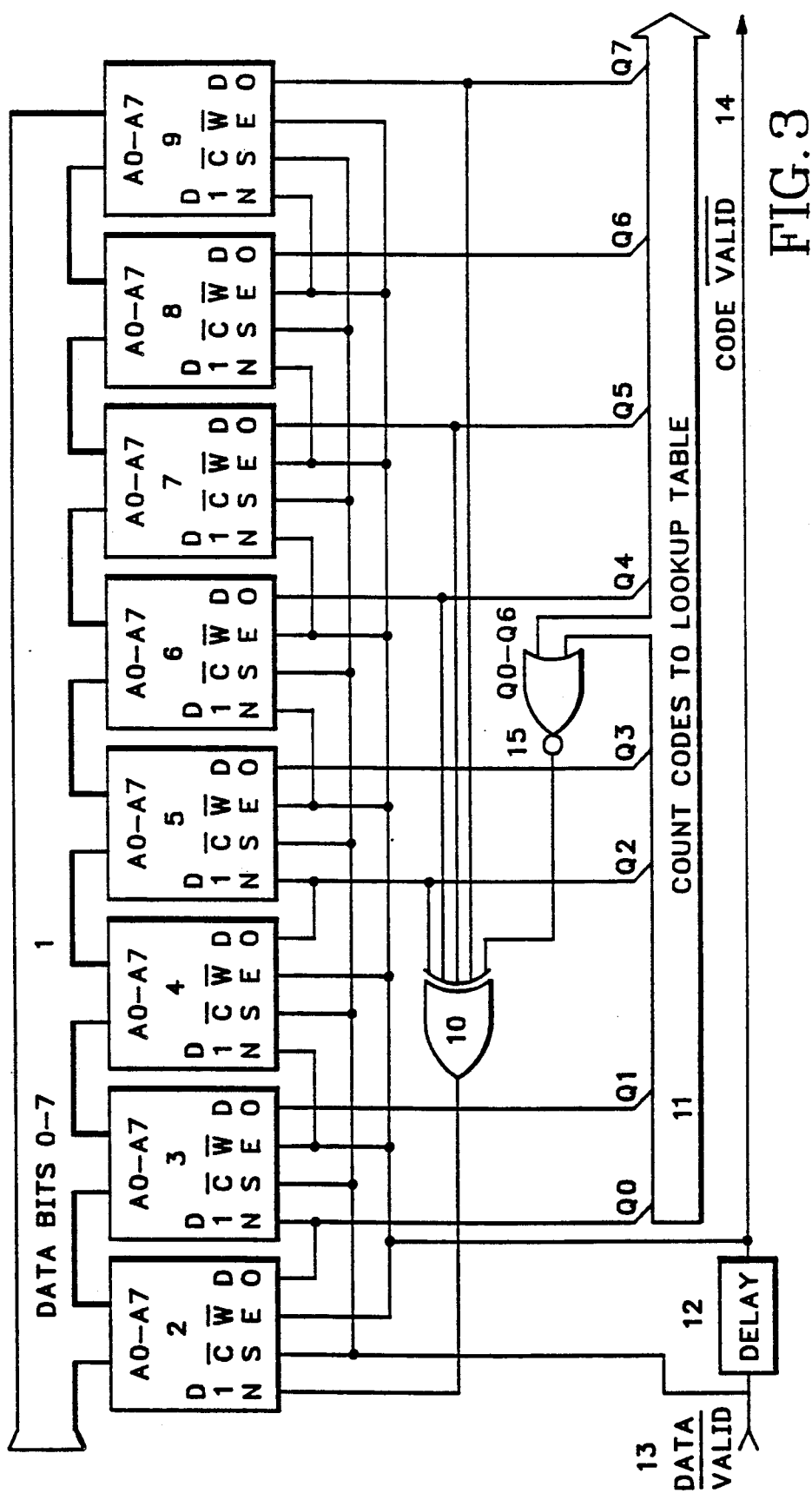
FIG. 3 is a schematic diagram of the RAM array and an improved feedback path arranged to form an array of linear feedback shift registers according to the present invention.

Referring to FIG. 3, the linear feedback shift register arrangement shown in FIG. 2 has been modified and improved. Conventional linear feedback shift registers, such as those in the array of FIG. 2, or any implementation that employs only an XOR gate, suffers from a drawback. When all of the bits are zeroes, the input to the first RAM is zero and the linear feedback shift register is stuck in a perpetual all-zeroes state. The addition of the NOR gate 15, wherein all of the bits except the highest order bit are NORed and applied as another input to the XOR gate 10, solves this problem by patching the all-zeroes state back into the main sequence.

In operation this modified linear feedback shift register works as follows: If there are any ones on the outputs of RAMs 2-8, the output of NOR gate 15 is low and the circuit behaves identically to the circuit shown in FIG. 2. If, however, the outputs of RAMs 2-8 are all zeroes, then there are two possibilities. If the output of RAM 9 is high, then the output of the XOR gate 10 will be low and the next code value is all zeroes. However, all zeroes means that the output of RAM 9 is now low, so that the high which is still coming from NOR gate 15 causes the output of the XOR gate 10 to go high, causing the next code value to be a 1. This provides for a full 2 ^ N count (where N is the number of RAM chips) and, since the sequence now includes all possible states, there is no need for initialization to avoid hangups. Initialization circuitry is not shown in FIG. 2, but is required with that type of feedback means to make sure that all of the linear feedback shift registers start counting from a known condition.

Figure 4:
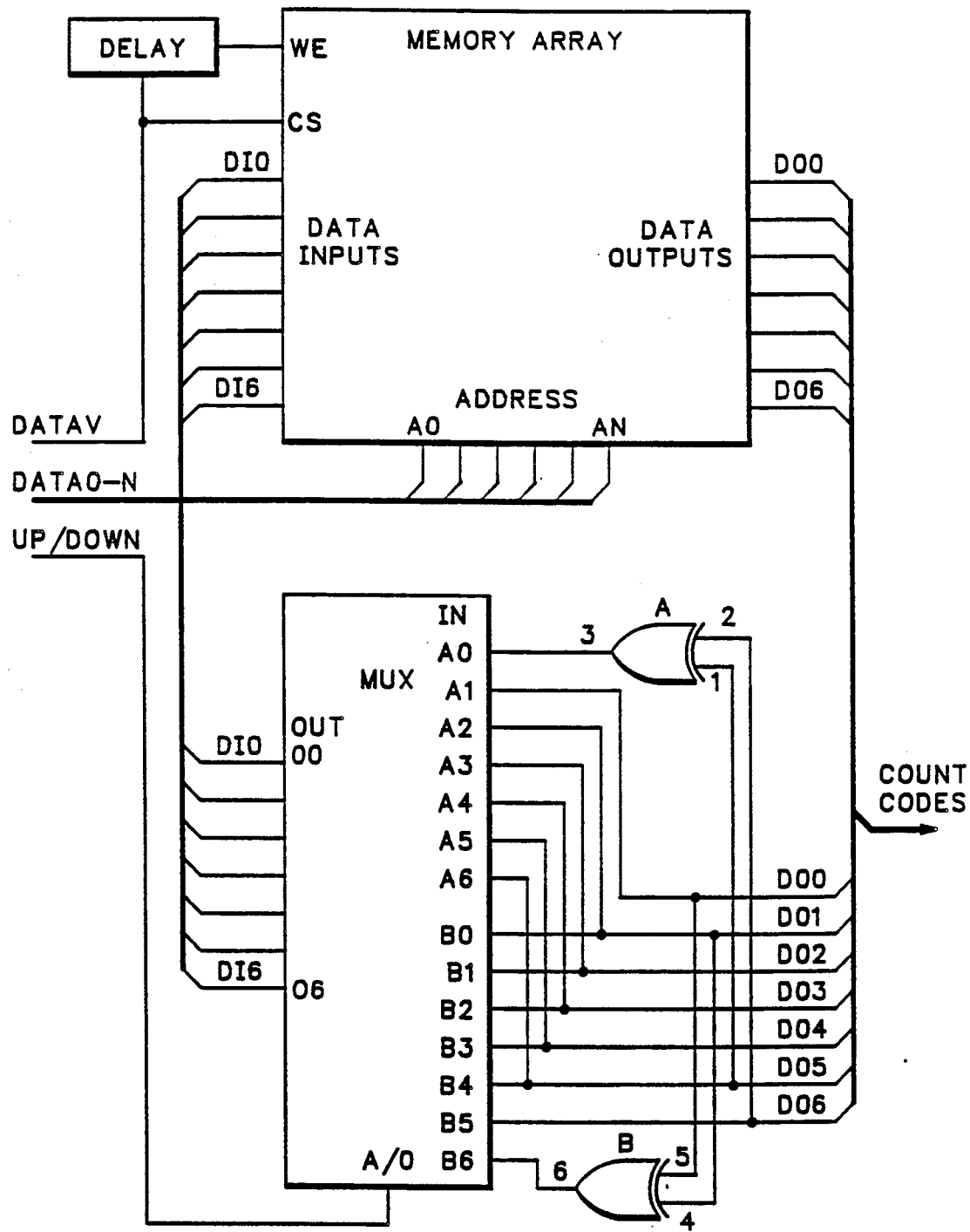
FIG. 4 is a schematic diagram of the array of linear feedback shift registers of the present invention, but with a multiplexer to select between two alternative feedback paths to provide both count-up and count-down modes of operation.

Referring now to FIG. 4, with a multiplexer (Mux) as part of the feedback means, the linear feedback shift registers in this array can count up or count down, depending on the state of the control line Up/Down to the Mux. With seven RAM bits, this array of linear feedback shift registers is modulo 127. The memory is accessed after Enable goes high and writes are performed when Write is asserted. And, again, the DataV-(alid) signal must last longer than the Delay time.

While the discussion thus far has implied that all of the data pattern combinations that occur on the signal lines must be counted individually, it is possible to only use higher order bits as the address input data and count occurrences of data that fall within ranges of data patterns, rather than counting individual data patterns.

While several particular embodiments of the present invention have been shown and described, it will be apparent to those skilled in the art that other changes and modifications may be made without departing from the invention in its broader aspects. The claims which follow are therefore intended to cover all such changes and modifications as fall within the true spirit and scope of the invention.

I claim:

1. An apparatus for counting the number of times that different digital data patterns occur on a set of signal lines, comprising:

an array of linear feedback shift registers implemented in random access memories (RAMs) with the set of signal lines connected to the address inputs of each RAM to select one of the linear feedback shift registers from the array according to the digital data pattern occurring on the set of signal lines; and means for causing the selected linear feedback shift register to shift upon the occurrence of a signal indicating that one of the digital signal patterns to be counted is present such that on each occurrence of the signal the content of the selected linear feedback shift register is incremented in a pseudo-random sequence.

2. An apparatus as recited in claim 1 further comprising means for translating coupled to a data output of the RAMs for translating pseudo-random codes generated by the linear feedback shift registers into meaningful numbers.

3. An apparatus as recited in claim 2 wherein the means for translating comprises a lookup table.

4. An apparatus as recited in claim 1 wherein the signal is a data valid signal and the means for causing comprises means for delaying the data valid signal to produce a code valid signal, with the data valid signal being applied to a chip select input of the RAMs and the code valid signal being applied to a write enable input of the RAMs.

5. An apparatus as recited in claim 1 wherein the array of linear feedback shift registers implemented in RAMs comprises:

a plurality of single bit RAMS arranged in a chain with the input of all except the first connected in series to the output of the preceding RAM in the clain; and means for providing feedback from a combination of the RAM outputs to the input of the first RAM in the chain.

6. An apparatus as recited in claim 5 wherein the feedback means comprises an exclusive-OR gate.

7. An apparatus as recited in claim 6 further comprising a NOR gate with all of the plurality of RAM data outputs except the last one as inputs, and with the output of the NOR gate coupled to be one of the inputs to the exclusive-OR gate.

8. An apparatus as recited in claim 5 wherein the feedback means comprises a multiplexer disposed to select for feedback one of two combinations of the data outputs, one of which causes counting up behavior of the apparatus and the other of which causes counting down behavior of the apparatus.

9. An apparatus for counting the number of times that different digital data patterns occur on a set of signal lines, the apparatus comprising:

means for delaying a data valid signal to produce a code valid signal;

a plurality of random access memories (RAMs), each having address inputs, a data input, a data output, a chip select control input, and a write enable control input, with the address inputs of each RAM coupled to the set of signal lines, with the chip select control inputs of each RAM coupled to the data valid signal, with the write enable control inputs of each RAM coupled to the code valid signal, and with the data inputs of each RAM, except the first RAM, coupled to the data output of the preceding RAM in the series; and feedback means for coupling a combination of the data outputs of the plurality of RAM to the data input of the first RAM;

whereby, on each occurrence of the data valid signal followed by the code valid signal, the contents of the RAMs at the address location specified by the address inputs is incremented in a pseudo-random count.

10. An apparatus as recited in claim 9 further comprising means for translating the pseudo-random count held by the plurality of RAMs into a meaningful non-random number.

11. An apparatus as recited in claim 10 wherein the means for translating comprises a lookup table.

12. An apparatus as recited in claim 9 wherein the feedback means comprises an exclusive-OR gate.

13. An apparatus as recited in claim 12 further comprising a NOR gate with all of the plurality of RAM data outputs except the last one as inputs, and with the output of the NOR gate coupled to be one of the inputs to the exclusive-OR gate.

14. An apparatus as recited in claim 9 wherein the feedback means comprises a multiplexer disposed to select for feedback one of two combinations of the data outputs, one of which causes counting up behavior of the apparatus and the other of which causes counting down behavior of the apparatus.

* * * * *